United States Patent [19]

Silbermann et al.

[11] Patent Number: 4,925,739
[45] Date of Patent: May 15, 1990

[54] SURFACE MODIFIED POLYMER ARTICLE AND PROCESS FOR MAKING SAME

[75] Inventors: Joseph Silbermann, Old Bridge; Michael T. Burchill, Cranbury, both of N.J.

[73] Assignee: M&T Chemicals Inc., Woodbridge, N.J.

[21] Appl. No.: 76,630

[22] Filed: Jul. 23, 1987

[51] Int. Cl.$^5$ .............................................. B32B 27/30
[52] U.S. Cl. .................................. 428/522; 428/911; 428/913
[58] Field of Search ..................... 428/522, 911, 913

[56] References Cited

U.S. PATENT DOCUMENTS

| | | | |
|---|---|---|---|
| 3,043,709 | 7/1962 | Ambroski | 428/421 |
| 3,297,462 | 1/1967 | Fanning | 427/160 |
| 3,519,462 | 7/1970 | Bristol et al. | 427/160 |
| 3,783,011 | 1/1974 | Chauffoureaux | 427/255.6 |
| 4,349,607 | 9/1982 | Ching | 428/412 |
| 4,770,905 | 9/1988 | Silbermann et al. | 427/160 |

Primary Examiner—Edith Buffalow
Attorney, Agent, or Firm—S. A. Marcus; W. Katz

[57] ABSTRACT

A surface modified U.V. stabilized article is described which includes a resinous sheet whose sides are both exposed to the air. The surface regions of both sides of the sheet are substantially fully modified in situ with a stabilizing amount of an ingredient such as a ultraviolet light stabilizer material, while the exposed surfaces are substantially free of residual stabilizer and solvent material. The appearance and degree of surface perfection of the modified sides of the sheet are substantially the same as that of an untreated sheet.

The U.V. stabilized resin article is made by a continuous process in which the resin body is immersed in a solution of a ultraviolet light stabilizer in a suitable organic solvent, and thereafter, residual stabilizer and solvent are displaced from the modified surface in situ. Both steps in the process are carried out in an environment which are non-evaporative of the solvent.

10 Claims, 2 Drawing Sheets

SURFACE MODIFIED POLYMER ARTICLE AND PROCESS FOR MAKING SAME

BACKGROUND OF INVENTION

1. Field of the Invention

This invention relates to a surface modified polymer article, and to a process for incorporating therein various ingredients such as ultraviolet light stabilizers down to a depth of about 200 microns, thereby protecting the articles against the degradative effects associated with exposure to ultraviolet light radiation.

2. Description of the Prior Art

Photodegradation of many types of solid polymeric articles by U.V. light has been a continual problem confronting the industry. U.V. degradation causes discoloration, embrittlement and deterioration of the article. Accordingly, U.V. absorber compounds have been incorporated into such polymeric articles in an attempt to provide effective stabilization to U.V. light.

However, since photodegradation is known to be a surface phenomenon, incorporation of U.V. stabilizers into the polymeric material prior to shaping into solid form has been largely uneconomical and inefficient because the stabilizer is present substantially in the interior of the shaped article, where it does not function effectively to prevent surface photodegradation.

Surface treatments have been proposed to provide more efficient U.V. protection for the resins. These surface treatments are based on the ability of various organic solvents to swell such resins as polyvinyl chloride. This swelling property enables the ultraviolet light stabilizer material to be directed principally into the surface region of the resin body. However, none of these surface treatments have been very successful commercially.

Another surface method comprises laminating the surface of the polymer with a layer of a film-forming material containing the U.V. stabilizer. The lamination approach, unfortunately, suffers from the problems of incompatibilities between polymer, U.V. stabilizer, and the film-forming material and its carrier components. Furthermore, the laminated layer and the surface of the polymer do not adhere well, and delamination upon shock or impact is a serious problem.

The swelling method is described by Katz, et al. in an article in the "Proceedings of the A.C.S. Div. of Org. Coatings and Plastics" 36, (1) p. 202-205 (1976), entitled "Ultraviolet Protection of Transparent PVC by Diffusion Coatings". Katz uses a dip method to impregnate a transparent PVC sheet to a given depth with a non-migrating ultraviolet light absorber. The dip technique comprises swelling the polymer with a carrier solvent, infusing the stabilizer from a solution thereof with the carrier, and, thereafter, heating the treated polymer in air at an elevated temperature to drive the stabilizer below the surface of the polymer and to remove residual solvent. Under these process conditions, however, only a small amount of stabilizer is absorbed into the surface region. Furthermore, the dip method produces a product in which both sides of the sheet are modified with ultraviolet absorber.

Jochanan, in Israeli Patent No. 39037, published Nov. 10, 1975, entitled "U.V.—and Oxidation-Proof Products from Organic Plastics and their Manufacture", describes various methods of applying a solution or suspension of an ultraviolet light absorber to the surface of a plastic sheet. The methods disclosed by Jochanan include immersion, spraying, brushing, roller-printing and curtain-coating. However, with such methods, a large amount of residual stabilizer and solvent is left on the surface of the article, whereupon the modified surface is observed to be streaky, hazy, and has runs or pock-marks thereon.

Humphrey, in U.S. Pat. No. 4,146,658, describes a process for producing an ultraviolet light stabilized polycarbonate article by dipping the polycarbonate sheet into an impregnating solution consisting of a selected combination of ultraviolet absorber and solvent. However, all the disadvantages of the conventional dip method is present here, too.

Ching, in U.S. Pat. No. 4,349,607, describes the incorporation of certain U.V. stabilizers into thermoplastic resins by dipping, spraying and brushing, followed by heating at 70° C., which is unsatisfactory for providing surface modified PVC sheets having a high degree of surface perfection.

Amborski, in U.S. Pat. No. 3,043,709, discloses an organic polymeric article having an ultraviolet light absorber compound incorporated adjacent to the surface of the article. The article is treated by several methods, including dipping-coating a polyethylene terephthalate film in a stabilizer solution, applying a dispersion or melt of the absorber, and applying the absorber as a powder. Thereafter, the coated film is heated in air to 115° C. and above to drive the absorber below the surface of the film and to remove the solvent. These processes, however, are disadvantageous because they require a heat-treatment to fully modify the surface of the film. Furthermore, the article which is produced has a considerable amount of residual absorber present on both sides of the film, which adversely affects its surface perfection and appearance.

Fanning, in U.S. Pat. No. 3,297,462, discloses a process for rendering polymeric films resistant to the deteriorating effects of sunlight by immersing the film in a solution of a benzophenone stabilizer in a solvent mixture of diethylene glycol and glycerine, and then washing successively in diethylene glycol and water. The polymers suitable for such treatment, however, must have a zero strength temperature of at least 200° C., which excludes many useful polymers, including polyvinyl chloride.

Solvay and Cie, in Belgium Patent No. 612,206, discloses a process for surface treating rigid polyvinyl chloride objects. The method comprises immersing the object in a swelling solvent containing a light stabilizer and then evaporating the solvent in air. This procedure, however, is ineffective because some stabilizer remains on the surface of the object, which creates a poor physical appearance, and, furthermore, environmental hazards are present during removal of the solvent in air.

Cohman, in U.S. Pat. No. 3,892,889, describes a method of applying a solution of a U.V. stabilizer to polycarbonate resin sheets. Such treated polymers, however, also are marred by the presence of residual stabilizer on the surface of the article.

Chilton, in U.S. Pat. No. 4,323,597 teaches a flow-coating process for polycarbonate articles. In this process, the surface of the polycarbonate is heated and a liquid stabilizer composition which is non-aggressive towards but wets the polycarbonate surface is flowed over the heated surface. There is no indication in this patent, however, that the method is applicable to polyvinyl chloride.

Christian, in U.S. Pat. No. 3,519,462, describes the treatment of polyvinyl chloride and other polymers with a solution of a U.V. stabilizer in a diol or triol. These solvents, however, are not efficient swelling agents for PVC. Furthermore, there is no recognition therein of the need for removing excess stabilizer solution present on the treated surface.

Chauffoureaux, in U.S. Pat. No. 3,783,011, describes a surface treatment comprising diffusing a vapor of a U.V. stabilizer into the surface of polyvinyl chloride and other polymers. Unfortunately, the vapor treated surfaces have very poor physical characteristics.

In summary, these and other processes have not provided useful U.V. stabilized articles, particularly polyvinyl chloride resin articles, for example, for use in residential siding, which use requires particularly effective protection from the weathering effects of sunlight, and an appearance and degree of surface perfection which is acceptable in commercial use.

Accordingly, there is a present need to effectively modify the exposed surface of a PVC sheet, particularly residential siding, with a U.V. stabilizer. Such a surface modified, U.V. stabilized PVC siding may preferably should have both surfaces of the sheet modified with the stabilizer material, and, particularly, the modified surfaces of the sheet should be substantially free of residual stabilizer and solvent material. The appearance and degree of surface perfection of both modified sides should be substantially the same as that of the untreated sheet. In addition, the surface modification should be effected in situ, that is, in an environment which is non-evaporative of the solvent, thereby to provide said desired product without creating environmental hazards.

Accordingly, it is an object of this invention to provide a surface modified, U.V. stabilized resin sheet article having both sides exposed to the air, and which is substantially fully modified in situ with a stabilizing amount of a U.V. stabilizer material, the modified surfaces being substantially free of residual stabilizer and solvent material, and the appearance and degree of surface perfection of the modified sides are substantially the same as that of an untreated side.

SUMMARY OF THE INVENTION

What is described herein is a surface modified, U.V. stabilized article which includes a resinous sheet whose sides are both exposed to the air. The surface regions of at least one side of the sheet is substantially fully modified in situ with a stabilizing amount of a modified ingredient, e.g. an ultraviolet light stabilizer material, while the exposed surfaces are substantially free of residual stabilizer and solvent material, and the appearance and degree of surface perfection of the modified side are substantially the same as that of an untreated sheet.

Suitably, the amount of stabilizer within the modified surface regions of the sheet article should be at least 0.3 g/m$^2$ of the surface area of the sheet, and, preferably, 0.5 to 10.7 g/m$^2$, and, most preferably 1.0 to 2.0 g/m$^2$, where the surface region is defined as a depth extending up to about 200 microns from the surface, preferably 50 to 150 microns. At least 70% of this stabilizing amount should be present within the first 100 microns of the surface region.

In accordance with the invention, the surface modified resin article is made by a continuous process comprising passing a resin body though a solution of a ultraviolet light stabilizer in a suitable organic solvent, and displacing residual stabilizer and solvent from the modified surfaces in situ, that is, in an environment which is non-evaporative of the solvent. In a preferred embodiment of the invention, the solution is the lower layer of the two-layer system, and an aqueous media is the upper layer and is used to displace residual solution.

DETAILED DESCRIPTION OF THE INVENTION

This invention involves incorporating at least one ingredient into a resinous article by the steps of:
  (a) contacting the surfaces of the articles with a solution of the ingredient in a solvent; and
  (b) displacing substantially all of any residual solution on the contacted surfaces, both steps being carried out in an environment which is non-evaporative of the solvent, i.e. in the absence of air.

In a preferred embodiment, the process is practiced in a continuous mode and involves the incorporation of at least one ultraviolet light stabilizer (hereinafter referred to as "U.V. stabilizer") in the surface regions of a sheet article fabricated from polyvinyl chloride (hereinafter referred to as "PVC") by steps of:
  (a) continuously transporting the article through a lower layer of an organic solvent solution containing the stabilizer, there being an aqueous media layer disposed thereabove which is immiscible with the lower layer; and
  (b) continuously withdrawing the article from the lower layer through the upper layer, and, while in the upper layer, and before the sheet contacts the outside atmosphere
  (c) displacing substantially all of the residual solution on the modified surfaces of the article.

Suitably, the amount of stabilizer within the modified surface regions of the sheet article should be at least 0.3 g/m$^2$ of the surface area of the sheet, and, preferably, 0.5 to 10.7 g/m$^2$, and, most preferably 1.0 to 2.0 g/m$^2$, where the surface region is defined as a depth extending up to about 200 microns from the surface, preferably 50 to 150 microns. At least 70% of this stabilizing amount should be present within the first 100 microns of the surface region.

The most preferred embodiment is practiced in the following manner:
  (a) continuously transporting a PVC sheet through a layer comprising a methylene chloride solution of a U.V. stabilizer which is present in an amount of 1 to 60 wt./vol %, based on the weight of the solution, preferably 5 to 50 wt./vol %, there being a layer of water disposed above the solution; the rate of transport of the sheet through the solution being selected so that the sheet remains in contact with the solution for a period of time ranging from about two seconds to about two minutes;
  (b) continuous withdrawing the sheet from the lower methylene chloride layer through the upper water layer, and
  (c) displacing substantially all of the residual solution on the modified surfaces by directing a jet stream of water onto the treated surfaces thereby to displace any residual solution thereon before the sheet contacts the outside atmosphere.

A feature of the invention, therefore, is that both steps of the process, i.e. (1) contacting the article with the solution containing the modifier ingredient(s), and (2) displacement of residual solution on the contacted surfaces, are carried out in an environment which will not permit any significant degree of evaporation of the solvent. Not only would such evaporation be wasteful, but it would also present an environmental hazard requiring special equipment in the workplace. Most importantly, if evaporation of the solvent is allowed to occur prior to completion of the displacement step, the treated article will have a rough, uneven surface and will have a streaked appearance caused by stabilizer residue being present on its outer surface. The required non-evaporative environment also may be accomplished in this invention by a two-tank system in which the resin article is immersed in a first tank full of solvent solution or is sealed such that evaporation of the solvent does not take place. Then displacement of residual solvent may take place in a second tank which is full of liquid (or sealed) capable of displacing the solution.

The most efficient method of accomplishing the proper non-evaporative type of environment is to utilize a solvent which has a density greater than 1 and an aqueous media with a density of not greater than one and incompatible, i.e. immiscible, with the solvent which is present as a layer above the solvent. The aqueous media may consist of a mixture of water and 5-50 wt. % of an alcohol such as a glycol, but preferably consists of water. Thus a water "seal" is present above the solvent layer preventing evaporation of the solvent.

As the thus-treated article is withdrawn from the solvent layer, it passes through the water layer where jets of water therein displace any residual solution present on the article surfaces. If desired, this solution may be recaptured and recycled to the solvent layer.

BRIEF DESCRIPTION OF THE DRAWINGS

The invention will be more clearly understood by referring to the following drawings, in which.

DETAILED DESCRIPTION OF THE INVENTION

Figure 1:
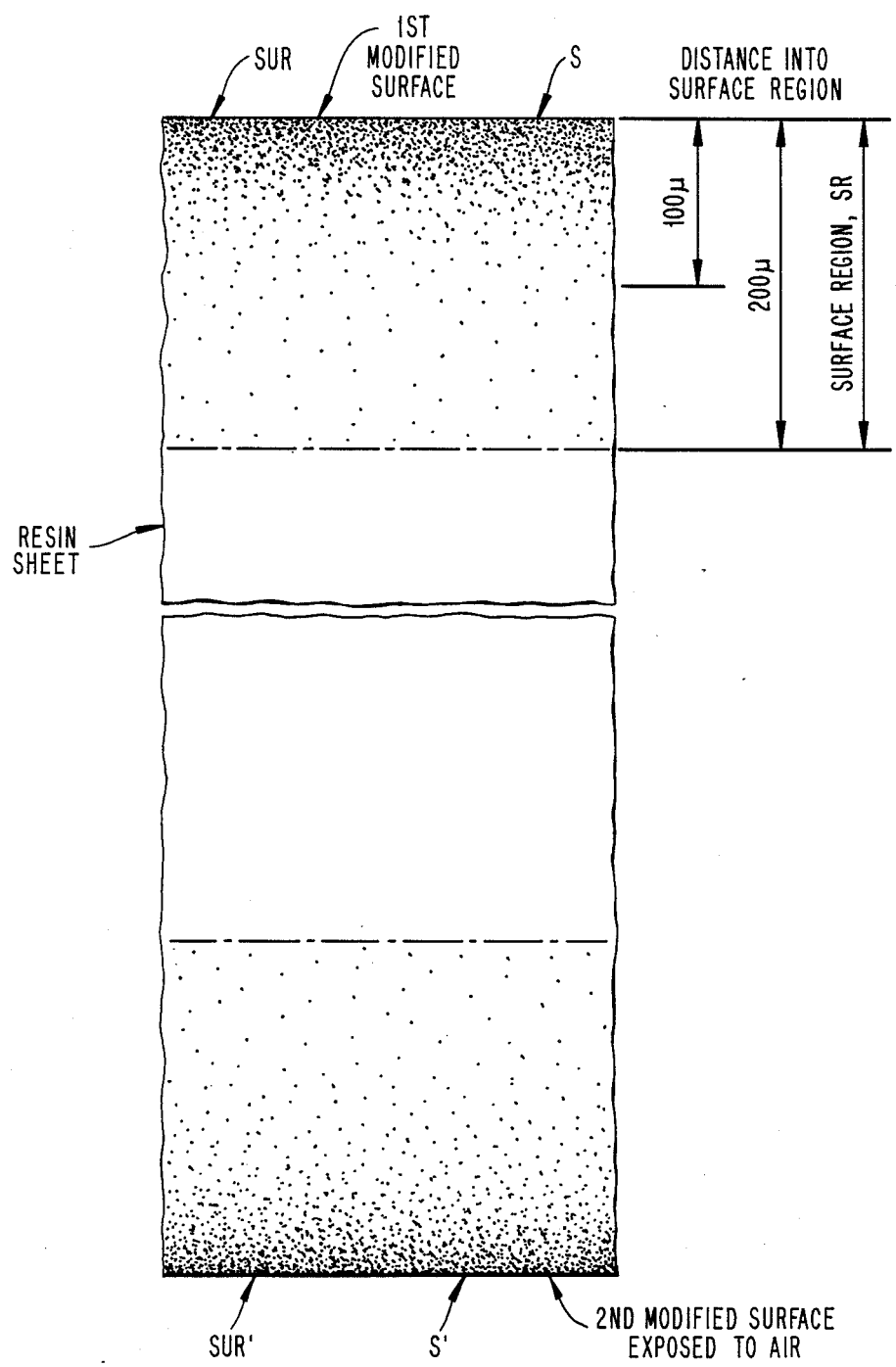
FIG. 1 shows the U.V. stabilized article of the present invention.

Referring now to the drawings, FIG. 1 shows the U.V. stabilized article of the present invention. The article includes a resin body, such as a sheet strip or other shaped structure thereof, of polyvinyl chloride or other polymeric resin. The article has sides S and S' which are exposed to the air. Each exposed side has respective surfaces SUR and SUR' both of which are modified in a similar manner. Side S for example, has a surface region SR extending from surface S to a depth of up to about 200 microns into said sheet. Surface region SR is modified with a stabilizing amount of a U.V. stabilizer material, which is an amount of at least 0.3 g/m$^2$ of the surface area of the sheet, and preferably 0.5 to 10.7 g/m$^2$ thereof. Preferably at least 70% or more of the stabilizer is found within the first 100 microns of the surface region. Stabilizer is substantially absent in the interior or bulk of the sheet, and surface SUR also is substantially free of residual stabilizer.

The uniformity, appearance and degree of surface perfection of both modified surfaces SUR and SUR' are substantially the same as that of an untreated surface. A surface of perfection herein is defined as a surface which is uniform, non-tacky and non-streaking, and which retains its original shape and hardness after being modified by contact with stabilizer solution.

The shaped resin body itself is obtained by general mechanical processing techniques known to those skilled in the art. Illustrative of such mechanical operations are compression, injection, jet, transfer molding, vacuum forming, extrusion and the like. Such bodies can range from flexible sheets to rigid structural members. However, the invention is aimed particularly at articles which are plagued by U.V. degradation accompanying outdoor weathering, and, particularly, rigid PVC residential siding.

Accordingly, polyvinyl chloride is the preferred resin for the article of the invention. However, other resins susceptible to impregnation with U.V. stabilizers also are suitable.

The resin article itself may be transparent, translucent, opaque, and with or without pigment, e.g. titanium dioxide and/or colorants.

Figure 2:
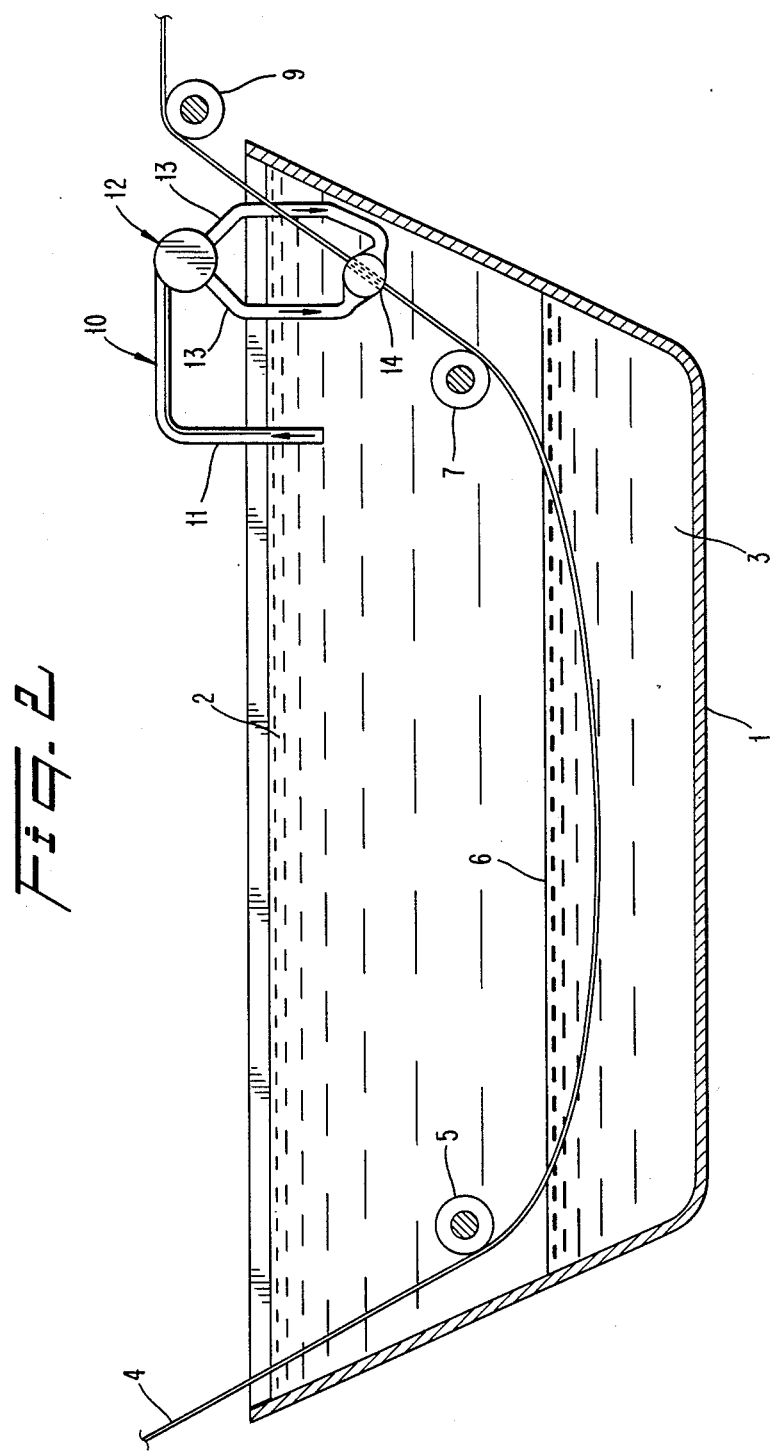
FIG. 2 is a schematic representation of an apparatus for making the U.V. stabilized article of FIG. 1 by a continuous process.

Referring now to FIG. 2, there is shown schematically an apparatus useful for making the U.V. stabilized resin article of the invention. The apparatus shown therein is a two-layer system, where a liquid such as water or an aqueous solution thereof is the upper layer, and a solution of stabilizer in an organic solvent is the lower layer.

The organic solvent is selected among solvents which do not mix with the liquid media; otherwise, the solvent would not reach the resin sheet but would simply dissolve therein. Another consideration in choice of solvent is an empirical one, namely, the desire to impregnate the resin article with the U.V. stabilizer within a minimum contact time. This property depends on a number of factors, particularly the ability of the solvent to effectively swell the resin surface.

The preferred system shown in FIG. 2 thus is a two-layered system in which the liquid phase is the upper layer and the stabilizer solution is the lower layer, and the resin sheet is oriented in an immersed state in the lower layer. In operation of such a two-layer process in a continuous manner, the resin article is transported through the lower layer where the solution is applied to both surfaces of the sheet. The organic solvent in the stabilizer solution is blocked from evaporating into the atmosphere by the blanket of liquid above it, which is advantageous for producing modified surfaces having a high degree of surface perfection, and for ecological reasons.

The apparatus of FIG. 2 includes a tank 1 about ¾ full with water as the upper layer 2. Stabilizer solution of a U.V. absorber in an organic solvent, e.g. methylene chloride, is present as the lower layer 3 therein. A continuous resin strip 4 of extruded polyvinyl chloride, for example, is fed into the lower layer 3 at a predetermined rate from below roller 5, which is positioned above surface 6 of the lower layer.

The thus-applied stabilizer solution remains on the surface of resin strip 4 whereupon both surface regions of the strip are modified effectively with stabilizer. The length of time the stabilizer solution remains on the surface of the sheet within the lower layer is referred to herein as the "contact time" of the process.

After passing through the solution layer 3, the treated strip passes over second roller 7 and enters the upper water layer 2 where residual stabilizer solution is displaced in situ from the modified surfaces of the strip. The term "in situ" means that the displacement step is carried out without exposing the treated surface to the ambient atmosphere; rather, the surface remains under water where the solvent cannot evaporate.

In the displacement zone of the upper layer 2, a jet element 10 directs a spray of displacing liquid, preferably water 2, at a pressure sufficient to displace residual stabilizer solution from both treated surfaces of the strip. Jet element 10 comprises hollow, perforated rods 13 terminating in slit 14 through which strip 4 is conveyed into the displacement zone.

Jet element 10 is fed by water from layer 2 via intake tube 11; pump 12 is employed for intake and spraying operations.

A third roller 9 is located ahead of the upper layer to direct the thus-treated resin strip out of the tank. Variable speed nip roller pullers (not shown) are positioned outside the tank to move the strip at a predetermined speed through and out of the tank, where it can be stored on a suitable take-up roll.

While a process has been described wherein both sides of the sheet are modified simultaneously with the stabilizer solution, the invention also may be practiced by immersing only one side of the sheet in the solution, the other side remaining in the aqueous layer, thereby providing a one-sided modified sheet article.

The equipment and procedure described above is applicable to organic solvents having a density which is less than 1, e.g. ethyl acetate, 2-pentanone, 3-pentanone and the like. For such organic solvents, the stabilizer solution would constitute the top layer and water the bottom layer.

The invention will be described now with the reference to the following examples, in which the U.V. stabilizer article of the present invention is prepared using the apparatus and system of FIG. 2.

PREPARATION OF U.V. STABILIZED ARTICLE OF INVENTION

Example 1

Using the apparatus of FIG. 2, with water as the upper layer and a solution of Cyasorb U.V. 5411 stabilizer (a trademark of American Cyanamid Co.) in methylene chloride as the upper layer, a horizontally supported, moving polyvinyl chloride resin strip was transported through the solution at 25° C. Thereupon stabilizer was absorbed into both surface regions of the upper and lower surfaces of the sheet. Within the upper layer, a jet of water was applied to both treated surfaces to displace any residual stabilizer and solvent still remaining thereon. The U.V. stabilized article then exited the tank and was wound onto a take-up roll.

PROPERTIES OF U.V. STABILIZED ARTICLE

Example 2

The U.V. stabilized article prepared in Example 1 was microtomed into sections extending to a total depth of 200 microns from the surface. The amount of U.V. stabilizer present in each of these sections was determined by means of high pressure liquid chromatography (HPLC) analysis.

The test results show that at least 0.3 g/m² of the stabilizer is deposited within the surface region of each side of the sheet, i.e. within a depth of up to 200 microns from the surface, and at least 70% of this amount is present within the first 100 microns of the surface region. Within the interior or bulk of the sheet, substantially no stabilizer is present. Furthermore, residual stabilizer and solvent (less than 1% of each) are absent on the modified surface of the sheet. The treated surfaces of the product were which was uniform, non-tacky, had no streaks of solid material thereon, and retained its original planarity and hardness. The surface perfection of both surfaces was substantially the same as that of an untreated sheet.

Example 3

Following the procedures of Examples 1 and 2, a range of concentrations of stabilizer solutions was applied onto the surfaces of the PVC sheet during various predetermined contact times. Table I shows the amount of stabilizer incorporated into each surface region of the resin sheet for such stabilizer concentrations and contact times using methylene chloride as the solvent.

TABLE I

Effect of Concentration of Stabilizer and Contact Time on Amount of Stabilizer Incorporated into Surface Region of Sheet

| Sample No. | Stabilizer Conc. (wt./vol %) | Contact Time (sec.) | Amount of Stabilizer in Surface Region (g/m²) |
|---|---|---|---|
| 1 | 1 | 120 | 1.8 |
| 2 | 2 | 120 | 3.8 |
| 3 | 3 | 15 | 3.9 |
| 4 | 3 | 30 | 4.0 |
| 5 | 3 | 45 | 4.8 |
| 6 | 3 | 60 | 5.0 |
| 7 | 3 | 75 | 5.3 |
| 8 | 3 | 90 | 5.4 |
| 9 | 3 | 105 | 5.7 |
| 10 | 3 | 120 | 6.1 |
| 11 | 5 | 15 | 2.7 |
| 12 | 5 | 30 | 3.6 |
| 13 | 5 | 45 | 4.3 |
| 14 | 5 | 60 | 5.0 |
| 15 | 5 | 75 | 5.3 |
| 16 | 5 | 90 | 5.8 |
| 17 | 5 | 105 | 6.6 |
| 18 | 5 | 120 | 8.7 |
| 19 | 60 | 15 | 4.8 |
| 20 | 60 | 30 | 7.1 |
| 21 | 60 | 45 | 9.1 |
| 22 | 60 | 60 | 11.2 |
| 23 | 60 | 75 | 12.5 |
| 24 | 60 | 90 | 12.6 |
| 25 | 60 | 105 | 13.6 |
| 26 | 60 | 120 | 14.8 |
| 27 | 1 | 10 | 0.3 |
| 28 | 1 | 15 | 0.5 |
| 29 | 1 | 30 | 1.0 |

The results in Table I show that application of stabilizer solution having a concentration of 1 wt./vol. % for 10 sec. provides an amount of stabilizer of at least 0.3 g/m² in the surface region of the sheet, which is sufficient to afford protection against U.V. light. At concentrations up to 6 wt./vol. % of stabilizer, and for contact times up to 2 min., even more effective U.V. protection is achieved.

Example 4

Following the procedure of Example 3, stabilizer solutions using dichloroethane, trichloroethylene, chloroform, and Freon TMC, and ethyl acetate were prepared in similar concentrations and contacted for similar contact times with polyvinyl chloride sheets. The results showed that amounts of stabilizer were incorporated into the surface regions of the sheet which afforded useful U.V. protection.

Example 5

The procedures of Examples 1–4 were repeated with comparable results using polyvinyl chloride having 0.5, 2, 6 and 12 phr of titanium dioxide therein.

Example 6

The procedures Examples 1–4 were repeated using samples having 0 phr titanium dioxide and including 1 phr blue pigment therein. Comparable results were obtained.

As described, the preferred liquid media in the method used herein is water or an aqueous solution or emulsion thereof. Other liquids, however, can be used as long as they are "incompatible" with the organic solvent. The term "incompatible" is defined herein to mean a liquid having a solubility of no more than about 15 percent by weight in the organic solvent at ambient temperature and pressure. Such liquids include alkanols and other water miscible liquids.

Similarly, the solvent in the stabilizer solution should be a "liquid-immiscible solvent", which also is defined as a solubility in the liquid at ambient temperature and pressure of no more than about 15 per cent by volume.

Accordingly, organic solvents suitable for use herein include water-immiscible organic solvents, as for example, halogenated hydrocarbons having up to six, preferably three, carbon atoms in the chain; ketones, both aliphatic and cycloaliphatic; aliphatic esters and the like. Representative halogenated hydrocarbons include methylene chloride, chloroform, 1,2-dichloroethane, 2-chloro-2-methylpropane and like chlorinated hydrocarbons. Exemplary ketones are 2-pentanone, 3-pentanone, 2-hexanone, 2,4-pentanedione and the like. Suitable ethers include diethyl ether, dipropyl ether, dimethoxy ethane, furan, tetrahydropyran and the like. Mixtures of mutually miscible organic solvents can also be used. The preferred organic solvents are methylene chloride, 1,2-dichloroethane, ethyl acetate, 2-pentanone and 3-pentanone, and mixtures of these solvents.

Suitable U.V. stabilizers include the following commercially available materials:
Cyasorb U.V. 9: 2-hydroxy-4-methoxybenzophenone (Trademark of American Cyanamid)
Cyasorb U.V. 531: 2-hydroxy-4-n-octoxybenzophenone (Trademark of American Cyanamid)
Cyasorb U.V. 5411: 2(2'-hydroxy-5'-t-octylphenyl)benzotriazole (Trademark of American Cyanamid)
Tinuvin P: 2(2'hydroxy-5'-methylphenyl)benzotriazole (Trademark of Ciba-Geigy)
0 Tinuvin 326: 2-(3't-butyl-2'-hydroxy-5'-methylphenyl)-5-chlorobenzotriazole (Trademark of Ciba-Geigy)
Sanduvor VSU: 2-ethyl-2-ethoxyanilide (Trademark of Sandoz Corp.)
Tinuvin 144 and 770: hindered amine light stabilizers (Trademark of Ciba Geigy for HALS)
Irgastab 2002: a nickel phosphate (Trademark of Ciba-Geigy)

The following is a partial list of these and other benzophenones and triazoles which are suitable U.V. stabilizers for use herein, although hindered amines, salicylates, formamidines, oxanilides and benzoates, etc. may be used as well.
2,2'-dihydroxybenzophenone
2,2,4,4,-tetrahydroxybenzophenone
2,2'-dihydroxy-4,4'-dimethoxybenzophnone
2,2'-dihydroxy-4,4'-diethoxybenzophenone
2,2'-dihydroxy-4,4'-dipropoxybenzophenone
2,2'-dihydroxy-4,4'-dibutoxybenzophenone
2,2'-dihydroxy-4-methoxy-4'-ethoxybenzophenone
2,2'-dihydroxy-4-methoxy-4'-propoxybenzophenone
2-hydroxy-4,4',5'-trimethoxybenzophenone
2-hydroxy-4-ethoxy-4'-methylbenzophenone
2-hydroxy-4-ethoxy-4'-ethylbenzophenone
2-hydroxy-4-ethoxy-4'-propylbenzophenone
2-hydroxy-4-ethoxy-4'-methoxybenzophenone
2-hydroxy-4,4-diethoxybenzophenone
2-hydroxy-4-ethoxy-4'-propoxybenzophenone
2-hydroxy-4-ethoxy-4'-butoxybenzophenone
2-hydroxy-4-ethoxy-4'-chlorobenzophenone
2-hydroxy-4-ethoxy-4; -bromobenzophenone
2-(2'-hydroxy-5'-methylphenyl)benzotriazole
2-(2'-hydroxy-5'-t-butylphenyl)benzotriazole
2-(2'-hydroxy-3'-methyl-5-t'-butylphenyl)benzotriazole
2-(2'-hydroxy-5'-cyclohexylphenyl)benzotriazole
2-(2'-hydroxy-3',5'-dimethylphenyl)benzotriazole
2-(2'-hydroxy-5'-t-butylphenyl)-5-chlorobenzotriazole
and
2-(2'-hydroxy-3'-di-t-butylphenyl)benzotriazole
2,2'-dihydroxy-4-methoxy-4'-butoxybenzophenone
2,2'-dihydroxy-4-ethoxy-4'-propoxybenzophenone
2,3'-dihydroxy-4,4'-dimethoxybenzophenone
2,3'-dihydroxy-4-methoxy-4'-butoxybenzophenone
2,3'-dihydroxy-4,4,5'-trimethoxybenzophenone
2-hydroxy-4,4,5'-trimethoxybenzophenone
2-hydroxy-4,4,6,'-tributoxybenzophenone
2-hydroxy-4-ethoxy-2,4'-dibutylbenzophenone
2-hydroxy-4-propoxy-4,6'-dichlorobenzophenone
2-hydroxy-4-propoxy-4',6'-dibromobenzophenone
2,4-dihydroxybenzophenone
2-hydroxy-4-methoxybenzophenone
2-hydroxy-4-ethoxybenzophenone
2-hydroxy-4-propoxybenzophenone
2-hydroxy-4-butoxybenzophenone
2-hydroxy-4-methoxy-4'methylbenzophenone
2-hydroxy-4-methoxy-4'propylbenzophenone
2-hydroxy-4-methoxy-4'butylbenzophenone
2-hydroxy-4-methoxy-4'-t-butylbenzophenone
2-hydroxy-4-methoxy-4'-chlorobenzophenone
2-hydroxy-4-methoxy-2'-chlorobenzophenone
2-hydroxy-4-methoxy-4'-bromobenzophenone
2-hydroxy-4,4'-dimethoxybenzophenone
2-hydroxy-4,4'-dimethoxy-3-methylbenzophenone
2-hydroxy-4,4'-dimethoxy-3-methylbenzophenone
2-hydroxy-4,4'-2'-ethylbenzophenone
2-hydroxy-acetophenone The preferred temperature for making the U.V. stabilized article of the present invention is ambient temperature. However, process temperatures lower and higher than ambient temperature may be used, if desired. For example, the water solubility of certain useful organic solvents, e.g. ethyl acetate, decreases with increasing temperature. Thus, it may be advantageous to use process temperatures higher than ambient temperature for such solvents. Similarly, organic solvents which swell a particular resin only modestly at room temperature can be rendered quite effective for infusion of the requisite amount of stabilizer into the surface region of the resin by raising the treatment temperature.

The invention is applicable also to resin article impregnated with ingredients additives other the U.V. stabilizers. For example, resins can be impregnated with such additives as anti-static agents, anti-oxidants, anti-block agents, dyes, slip additives, and the like.

Although the invention has been described in its preferred forms with a certain degree of particularity, it is understood that the present disclosure has been made only by way of example and that numerous changes can be made without departing from the spirit and the scope of this invention.

What is claimed is:

1. A U.V. stabilized article comprising: a polyvinyl chloride resinous sheet whose sides are both exposed to the air, the surface regions of at least one side of said sheet being modified with a stabilizing amount of an ultraviolet light stabilizer, the exposed surfaces being substantially free of stabilizer material, and the uniformity, appearance and degree of surface perfection of said modified side being substantially the same as that of untreated sheet, wherein said stabilizing amount is at least 0.3 g/m² of a surface of said sheet, said surface region extends to a depth of up to 200 microns from said surface, and at least 70% of said stabilizer material is present in the first 100 microns of said surface region, wherein said degree of surface perfection is characterized by said surface being non-tacky, non-streaking and having substantially its original shape and hardness.

2. A U.V. stabilized article according to claim 1 wherein said stabilizing amount is 0.5 to 10.7 g/m² of a surface of said sheet.

3. A U.V. stabilized article according to claim 1 wherein said resin is a flexible, rigid or semi-rigid polyvinyl chloride resin.

4. A U.V. stabilized article accordingly to claim 1 wherein said surfaces are modified in situ.

5. A U.V. stabilized article according to claim 3 wherein said stabilizing amount is 0.5 to 10.7 g/m² of a surface of said sheet.

6. A U.V. stabilized article according to claim 1 wherein said resinous sheet is transparent, translucent, opaque, and/or pigmented.

7. A U.V. stabilized article according to claim 1 wherein said resinous sheet includes a white pigment therein in an amount of at least 0.5 phr.

8. A U.V. stabilized article according to claim 8 wherein said white pigment is present in an amount of less than 8 phr.

9. A U.V. stabilized article according to claim 8 wherein said white pigment is titanium dioxide.

10. A U.V. stabilized article according to claim 1 wherein titanium dioxide is not present in said resin, but it includes a coloring pigment.

* * * * *

UNITED STATES PATENT AND TRADEMARK OFFICE
CERTIFICATE OF CORRECTION

PATENT NO. : 4,925,739

DATED : May 15, 1990

INVENTOR(S) : Joseph Silbermann, et al

It is certified that error appears in the above-identified patent and that said Letters Patent is hereby corrected as shown below:

Column 12, line 18, "claim 8" should read --claim 7--.

Signed and Sealed this

Fifth Day of January, 1993

Attest:

DOUGLAS B. COMER

*Attesting Officer*   *Acting Commissioner of Patents and Trademarks*